United States Patent
Duan et al.

(10) Patent No.: US 12,277,018 B2
(45) Date of Patent: Apr. 15, 2025

(54) MEMORY SYSTEM AND OPERATION METHOD THEREOF AND POWER MANAGEMENT MODULE

(71) Applicant: YANGTZE MEMORY TECHNOLOGIES CO., LTD., Wuhan (CN)

(72) Inventors: Guiyuan Duan, Wuhan (CN); Meifa Chen, Wuhan (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 142 days.

(21) Appl. No.: 18/203,596

(22) Filed: May 30, 2023

(65) Prior Publication Data
US 2024/0295916 A1    Sep. 5, 2024

(30) Foreign Application Priority Data

Mar. 1, 2023    (CN) .......................... 202310190755.1

(51) Int. Cl.
| | | |
|---|---|---|
| G06F 1/32 | (2019.01) | |
| G06F 1/3225 | (2019.01) | |
| G06F 1/3234 | (2019.01) | |

(52) U.S. Cl.
CPC .......... *G06F 1/3275* (2013.01); *G06F 1/3225* (2013.01)

(58) Field of Classification Search
CPC ........ G06F 1/3275; G06F 1/3225; G11C 5/14
See application file for complete search history.

(56) References Cited

U.S. PATENT DOCUMENTS

| | | | |
|---|---|---|---|
| 2012/0226927 A1* | 9/2012 | Kagan ................... | G06F 1/3225 713/323 |
| 2014/0258745 A1* | 9/2014 | Ehrlich ................. | G06F 3/0625 713/320 |
| 2021/0018975 A1* | 1/2021 | Liang .................... | G06F 3/0625 |

* cited by examiner

*Primary Examiner* — Stefan Stoynov
(74) *Attorney, Agent, or Firm* — BAYES PLLC (57) ABSTRACT

Implementations of the present disclosure disclose a memory system and an operation method thereof. The memory system comprises at least one memory device and a memory controller coupled with the at least one memory device. The memory controller is configured to: in respond to an instruction of a host coupled with the memory system, control the memory system to enter a first activation mode and a transition mode sequentially. The transition mode includes an idle mode and a first sleep mode. A power of the memory system in the first sleep mode is less than a power of the memory system in the idle mode. The power of the memory system in the idle mode is less than a power of the memory system in the first activation mode.

20 Claims, 6 Drawing Sheets

MEMORY SYSTEM AND OPERATION METHOD THEREOF AND POWER MANAGEMENT MODULE

CROSS-REFERENCE TO RELATED APPLICATIONS

This application claims the benefit of priority to China Patent Application No. CN 202310190755.1, filed on Mar. 1, 2023, the content of which is incorporated herein by reference in its entirety.

TECHNICAL FIELD

The present disclosure relates to the technical field of semiconductors, and particularly to a memory system, an operation method of a memory system, and a power management module.

BACKGROUND

Chips may comprise a memory system for storing user data in computing apparatuses such as a personal computer, a server, or a mobile phone, or the like. The memory system comprises memory devices and a memory controller, where the memory devices may include flash memory devices such as NAND flash memory devices. The memory controller may receive reading-writing or erasing commands from a host (e.g., a central processing unit), and control the memory devices to perform relevant operations. In different usage scenarios, the total amount of data required by the host and the number of reading times of the memory apparatuses are also different, and the access time and power consumption of the memory devices are different as well. When the host performs data interaction with the memory system, the memory system is in a good working state, and will require large power consumption to respond to data demands of the host quickly. When the memory system has no data transmission with the host, the power consumption of the memory system will be increased if the memory system still maintains this data transmission state. How to reduce the power consumption of the memory system in different usage scenarios has become an urgent issue to be addressed.

SUMMARY

According to a first aspect of an implementation of the present disclosure, a memory system is provided, which comprises: a memory controller and at least one memory device coupled with the memory controller, wherein the memory system can respond to an instruction of a host, and the memory controller is configured to: control the memory system to enter a first activation mode and a transition mode sequentially, wherein the transition mode includes an idle mode and a first sleep mode; the power of the memory system in the first sleep mode is less than the power of the memory system in the idle mode; and the power of the memory system in the idle mode is less than the power of the memory system in the first activation mode.

In some implementations, the memory controller is configured to: control the memory system to enter a second activation mode and a second sleep mode sequentially after the transition mode, wherein the power of the second sleep mode is less than the power of the second activation mode.

In some implementations, the ratio of the duration that the idle mode maintains to the duration that the first sleep mode maintains is determined according to historical data of the memory system switching from the idle mode to the first activation mode.

In some implementations, the duration that the first sleep mode maintains is longer than the duration that the idle mode maintains.

In some implementations, the ratio of the duration that the idle mode maintains to the duration that the first sleep mode maintains is 1:9.

In some implementations, the second sleep mode includes a Normal Sleep mode and a Deep Sleep mode; and the first sleep mode is the Normal Sleep mode, wherein the power of the memory system in the Deep Sleep mode is less than the power of the memory system in the Normal Sleep mode.

The memory controller is configured to: control the memory system to enter the Normal Sleep mode first, maintain the Normal Sleep mode for a period of time, and then enter the Deep Sleep mode in a process of entering the second sleep mode.

In some implementations, the memory controller is configured to: cut off power supplies of the memory devices when the memory system is in the Normal Sleep mode.

In some implementations, the memory controller is configured to: store current data into the memory devices before the memory system enters the Deep Sleep mode.

In some implementations, the memory controller is configured to: cut off power supplies of the memory devices, a power supply of an interface between the memory controller and the host, and a power supply of the memory controller, when the memory system is in the Deep Sleep mode.

In some implementations, the memory system comprises a Universal Flash Storage UFS apparatus.

According to a second aspect of an implementation of the present disclosure, an operation method of a memory system is provided, which is characterized by comprising: a memory controller controls the memory system to enter a first activation mode and a transition mode, wherein the transition mode includes an idle mode and a first sleep mode; the power of the memory system in the first sleep mode is less than the power of the memory system in the idle mode; and the power of the memory system in the idle mode is less than the power of the memory system in the first activation mode.

In some implementations, the operation method further comprises: the memory controller controls the memory system to enter a second activation mode and a second sleep mode sequentially after the memory system is in the transition mode, wherein the power of the second sleep mode is less than the power of the second activation mode.

In some implementations, the second sleep mode includes a Normal Sleep mode and a Deep Sleep mode, and the first sleep mode is the Normal Sleep mode, wherein the power of the memory system in the Deep Sleep mode is less than the power of the memory system in the Normal Sleep mode; the operation method comprises: the memory controller controls the memory system to enter the Normal Sleep mode first, maintain the Normal Sleep mode for a period of time, and then enter the Deep Sleep mode in a process of entering the second sleep mode.

In some implementations, the operation method comprises: the memory controller cuts off power supplies of the memory devices when the memory system enters the Normal Sleep mode.

In some implementations, the operation method comprises: the memory controller stores current data into the memory devices before the memory system enters the Deep Sleep mode.

In some implementations, the operation method comprises: the memory controller cuts off power supplies of the memory devices, a power supply of an interface between the memory controller and a host, and a power supply of the memory controller, when the memory system enters the Deep Sleep mode.

According to a third aspect of an implementation of the present disclosure, a power management module is provided, which is disposed on a first electronic apparatus that can respond to an instruction of a second electronic apparatus, and the power management module is configured to: control the first electronic apparatus to enter a first activation mode and a transition mode sequentially, wherein the transition mode includes an idle mode and a first sleep mode; the power of the first electronic apparatus in the first sleep mode is less than the power of the first electronic apparatus in the idle mode; and the power of the first electronic apparatus in the idle mode is less than the power of the first electronic apparatus in the first activation mode.

In some implementations, the power management module is configured to: control the first electronic apparatus to enter a second activation mode and a second sleep mode sequentially after the transition mode, wherein the power of the second sleep mode is less than the power of the second activation mode.

In some implementations, the ratio of the duration that the idle mode maintains to the duration that the first sleep mode maintains is determined according to on historical data of the first electronic apparatus switching from the idle mode to the first activation mode.

In some implementations, the duration that the first sleep mode maintains is longer than the duration that the idle mode maintains.

In some implementations, the ratio of the duration that the idle mode maintains to the duration that the first sleep mode maintains is 1:9.

In some implementations, the second sleep mode includes a Normal Sleep mode and a Deep Sleep mode; and the first sleep mode is the Normal Sleep mode, wherein the power of the first electronic apparatus in the Deep Sleep mode is less than the power of the first electronic apparatus in the Normal Sleep mode; the power management module is configured to: control the first electronic apparatus to enter the Normal Sleep mode first, maintain the Normal Sleep mode for a period of time, and then enter the Deep Sleep mode in a process of entering the second sleep mode.

In some implementations, the power management module is configured to: cut off power supplies of functional devices in the first electronic apparatus when in the first sleep mode or the second sleep mode.

According to the implementations of the present disclosure, the memory controller is configured to control the memory system to enter the first activation mode, idle mode and the first sleep mode, where the power of the memory system in the first sleep mode is less than the power of the memory system in the idle mode, and the power of the memory system in the idle mode is less than the power of the memory system in the first activation mode, thereby decreasing the duration ratio of idle mode, and maintaining a low response delay of the memory system while reducing the power consumption of the memory system.

DETAILED DESCRIPTION

The technical solution of the present disclosure is further set forth below in detail in conjunction with the appended drawings and particular implementations.

In the implementations of the present disclosure, the terms "first", "second" and the like are used to distinguish similar objects, and are not used to describe a specific sequence or sequential order.

In the implementations of the present disclosure, the term "A contacts with B" includes a situation where A directly contacts with B, or a situation where A indirectly contacts with B with other components being interposed between A and B.

In the implementations of the present disclosure, the term "layer" refers to a material portion including a region with a thickness. A layer may extend over the entirety of an underlying or overlying structure, or may have an extent less than the extent of the underlying or overlying structure. Furthermore, a layer may be a region of a homogeneous or inhomogeneous continuous structure that has a thickness less than the thickness of a continuous structure. For example, a layer can be located between any pair of horizontal planes between, or at, a top surface and a bottom surface of the continuous structure. A layer may extend horizontally, vertically, and/or along an inclined surface. And, a layer may include multiple sub-layers.

It is to be understood that the meaning of "on", "over" and "above" in the present disclosure should be interpreted in the broadest manner such that "on" not only represents the meaning of "on" something without an intermediate feature or a layer therebetween (i.e., directly on something) but also includes the meaning of "on" something with an intermediate feature or a layer therebetween.

It is to be noted that although this specification is described according to the implementations, not every implementation only contains an independent technical solution, and such a way of description on this specification is only for the sake of clarity. Those skilled in the art should take the specification as a whole, and the technical solutions in various implementations may be combined properly to form other implementations that can be understood by those skilled in the art.

Figure 1:
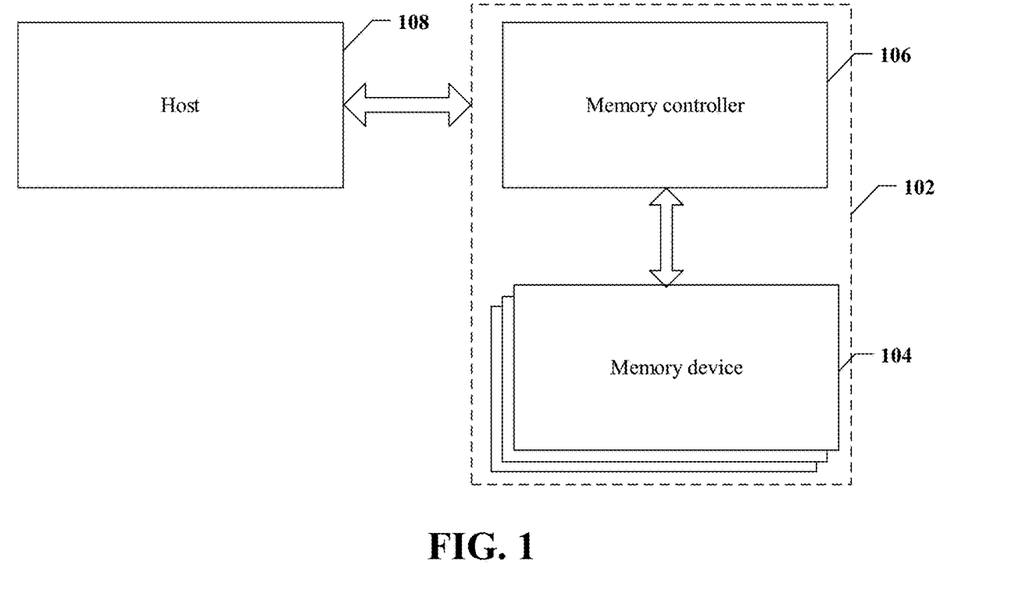
FIG. 1 is a schematic diagram illustrating an exemplary system having a memory system, according to implementations of the present disclosure.

FIG. 1 illustrates a block diagram of an exemplary system 100 having memory devices, according to some aspects of implementations of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. As shown in FIG. 1, the system 100 may comprise a host 108 and a memory system 102, where the memory system 102 has one or more memory devices 104 and a memory controller 106. The host 108 may be a processor (e.g., a central processing unit (CPU)) or a system on chip (SOC) (e.g., an application processor (AP)) of an electronic apparatus. The host 108 may be configured to send or receive data to or from the memory devices 104.

The memory device 104 may be any memory disclosed in the present disclosure. As disclosed below in detail, the memory device 104 (e.g., a NAND flash memory (such as, a three-dimensional (3D) NAND flash memory)) may have a reduced leakage current from a drive transistor (e.g., a string driver) coupled to unselected word lines during erasing operations, which allows for further reduction of the size of the drive transistor.

According to some implementations, the memory controller 106 is coupled to the memory devices 104 and the host 108, and configured to control the memory devices 104. The memory controller 106 can manage the data stored in memory devices 104 and communicate with host 108.

In some implementations, the memory controller 106 is designed for operating in a low duty-cycle environment such as Secure Digital (SD) cards, Compact Flash (CF) cards, Universal Serial Bus (USB) flash drives, or other media for usage in electronic apparatuses, such as personal computers, digital cameras, mobile phones, etc. In some implementations, the memory controller 106 is designed for operating in high duty-cycle environment SSDs or embedded Multi-Media Cards (eMMCs) used as data memories for mobile apparatuses, such as smartphones, tablet computers, laptop computers, etc., and enterprise memory arrays. The memory controller 106 may be configured to control operations of the memory devices 104, such as reading, erasing, and programming operations. The memory controller 106 may be further configured to manage various functions with respect to data stored or to be stored in the memory devices 104, including, but not limited to bad-block management, garbage collection, logical-to-physical address conversion, wear leveling, etc.

In some implementations, the memory controller 106 is further configured to process error correction codes (ECCs) with respect to the data read from or written to the memory devices 104. The memory controller 106 may further perform any other suitable functions as well, for example, formatting the memory devices 104. The memory controller 106 may communicate with an external apparatus (e.g., the host 108) according to a particular communication protocol. For example, the memory controller 106 may communicate with the external apparatus through at least one of various interface protocols, such as a USB protocol, a MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

Figure 2A:
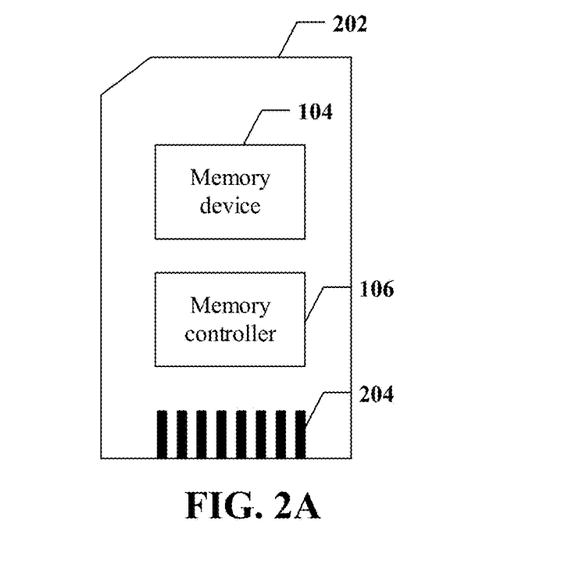
FIG. 2A is a schematic diagram illustrating an exemplary memory card having a memory system, according to implementations of the present disclosure.
Figure 2B:
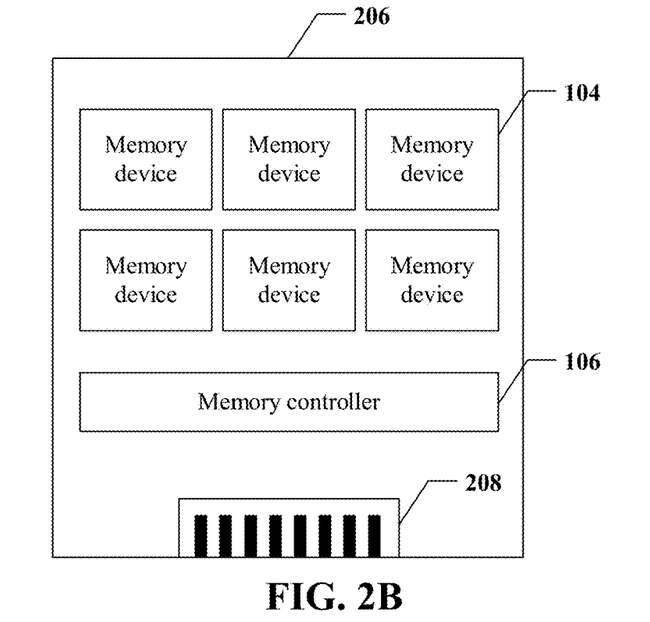
FIG. 2B is a schematic diagram illustrating an exemplary solid-state drive having a memory system, according to implementations of the present disclosure.

The memory controller 106 and the one or more memory devices 104 can be integrated into various types of storage apparatuses, for example, be included in the same package, such as a Universal Flash Storage (UFS) package or an eMMC package. That is to say, the memory system 102 can be implemented and packaged into different types of end electronic products. In one example as shown in FIG. 2a, the memory controller 106 and a single memory device 104 may be integrated into a memory card 202. The memory card 202 may include a PC card (PCMCIA, Personal Computer Memory Card International Association), a CF card, a Smart Media (SM) card, a memory stick, a Multi-media card (MMC, RS-MMC, MMCmicro), an SD card (SD, miniSD, microSD, SDHC), a UFS, etc. The memory card 202 may further include a memory card connector 204 coupling the memory card 202 with a host (e.g., the host 108 in FIG. 1). In another example as shown in FIG. 2b, the memory controller 106, and multiple memory devices 104 may be integrated into an SSD 206. The SSD 206 may further include an SSD connector 208 coupling the SSD 206 with a host (e.g., the host 108 in FIG. 1). In some implementations, the storage capacity and/or the operation speed of the SSD 206 are greater than those of the memory card 202. The implementations of the present disclosure do not limit package body forms and execution protocols of the memory controller and the memory devices, which may be selected and optimized according to a host interface protocol and actual demands of users.

In some implementations, the memory devices may include memory arrays and peripheral circuits, where the memory arrays and the peripheral circuits may be disposed on the same wafer, i.e., the memory arrays and the peripheral circuits are disposed on the same die to constitute one chip; the memory arrays and the peripheral circuits may also be disposed on different wafers respectively, i.e., the memory array dies and the peripheral circuit dies constitute one chip through hybrid bonding. The dies as mentioned in the implementations of the present disclosure take memory arrays as a division object. One die may comprise or may not comprise peripheral circuits, and the memory array may comprise a plurality of dies. One die of the memory array at least comprises one plane; adjacent planes may be divided by cutting lanes; each plane may comprise a plurality of pages; memory cells on each page share a word line; and each page may act as a minimum unit of the reading and writing operations. Each plane may be divided into a plurality of blocks, each of which may act as a minimum unit of the erasing operation. One memory device may comprise one or more dies. One memory device may comprise a plurality of memory arrays.

Figure 3:
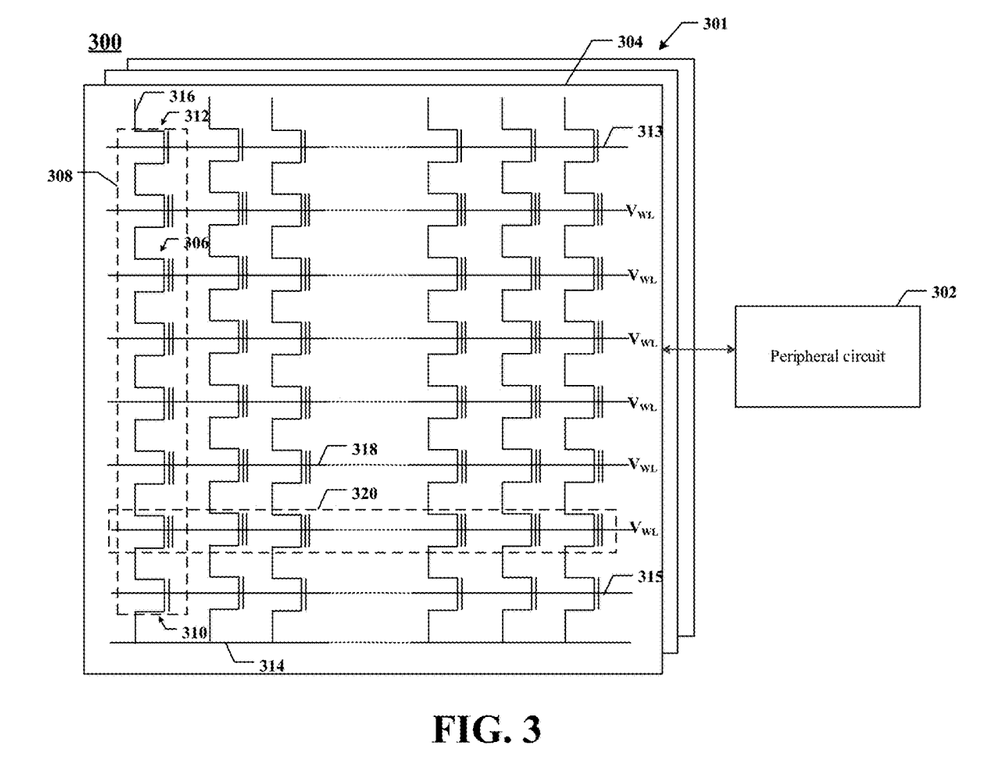
FIG. 3 is a schematic diagram illustrating an exemplary memory device comprising a peripheral circuit, according to implementations of the present disclosure.

FIG. 3 illustrates a schematic circuit diagram of an exemplary memory device 300 including a peripheral circuit, according to some aspects of implementations of the present disclosure. The memory device 300 may be an example of the memory devices 104 in FIG. 1. The memory device 300 may include a memory array 301 and a peripheral circuit 302 coupled to the memory array 301. The memory array 301 may be a NAND flash memory array, wherein memory cells 306 are provided in an array of NAND memory strings 308, and each NAND memory string 308 extends vertically above a substrate (not shown).

In some implementations, each NAND memory string 308 comprises a plurality of memory cells 306 that are coupled in series and stacked vertically. Each memory cell 306 can hold a continuous, analog value, such as an electrical voltage or charge, that depends on the number of electrons trapped within a region of the memory cell 306. Each memory cell 306 may be either a "floating gate" type memory cell that includes a floating gate transistor, or a "charge trap" type memory cell that includes a charge trap transistor.

In some implementations, each memory cell 306 is a single-level cell (SLC) that has two possible memory states and thus can store one bit of data. For example, the first memory state "0" may correspond to a first range of voltage, and the second memory state "1" may correspond to a second range of voltage. In some implementations, each memory cell 306 is a multi-level cell (MLC) that is capable of storing more than a single bit of data in more than four memory states. For example, the MLC can store two bits per cell, three bits per cell (also known as a triple-level cell (TLC)), or four bits per cell (also known as a quad-level cell (QLC)). Each MLC can be programmed to assume a range of possible nominal storage values. In one example, if each MLC stores two bits of data, the MLC can be programmed to write one of three possible nominal storage values to the cell, while a fourth nominal storage value other than the three nominal storage values may be used to represent the erasing state.

As shown in FIG. 3, each NAND memory string 308 may include a source select gate (SSG) 310 at its source terminal and a drain select gate (DSG) 312 at its drain terminal. The SSGs 310 and the DSGs 312 may be configured to activate selected NAND memory strings 308 (columns of the array) during reading and programming operations. In some implementations, the sources of the NAND memory strings 308 in the same block 304 are coupled through the same source line (SL) 314, e.g., a common SL.

According to some implementations, all of the NAND memory strings 308 in the same block 304 have an array common source (ACS). According to some implementations, the DSG 312 of each NAND memory string 308 is coupled to a respective bit line 316 which the data can be read from or written to via an output bus (not shown). In some implementations, each NAND memory string 308 is configured to be selected or unselected by applying a select voltage (e.g., above a threshold voltage of a transistor having the DSG 312) or an unselect voltage (e.g., 0 V) to the respective DSG 312 via one or more DSG lines 313 and/or by applying a select voltage (e.g., above a threshold voltage of a transistor having the SSG 310) or an unselect voltage (e.g., 0 V) to the respective SSG 310 via one or more SSG lines 315.

As shown in FIG. 3, the NAND memory strings 308 can be organized into multiple blocks 304, each of which may have a common source line 314, e.g., coupled to the ground. In some implementations, each block 304 is a basic data unit for erasing operations, i.e., all the memory cells 306 on the same block 304 are erased at the same time. To erase the memory cells 306 in a selected block 304a, the source lines 314 coupled to the selected block 304a as well as unselected blocks 304b that are in the same plane as the selected block 304a can be biased with an erase voltage (Vers), such as a high positive voltage (e.g., 20 V or more).

It is to be understood that in some examples, an erasing operation may be performed at a half-block level, a quarter-block level, or a level having any suitable number of blocks or any suitable fractions of a block. The memory cells 306 of adjacent NAND memory strings 308 may be coupled through word lines 318 that select which row of memory cells 306 is affected by reading and programming operations. In some implementations, each word line 318 is coupled to a page 320 coupled to the memory cells 306, and the page 320 is a basic data unit for programming operations. The size of a page 320 in bits can relate to the number of NAND memory strings 308 coupled by the word line 318 in one block 304. Each word line 318 may include a plurality of control gates (gate electrodes) at each memory cell 306 in the respective page 320 and a gate line coupling the control gates. The page 320 as shown in FIG. 3 may comprise a row of memory cells 306, and may comprise a plurality of rows of memory cells 306 that share one word line voltage and are on the same layer.

Figure 4:
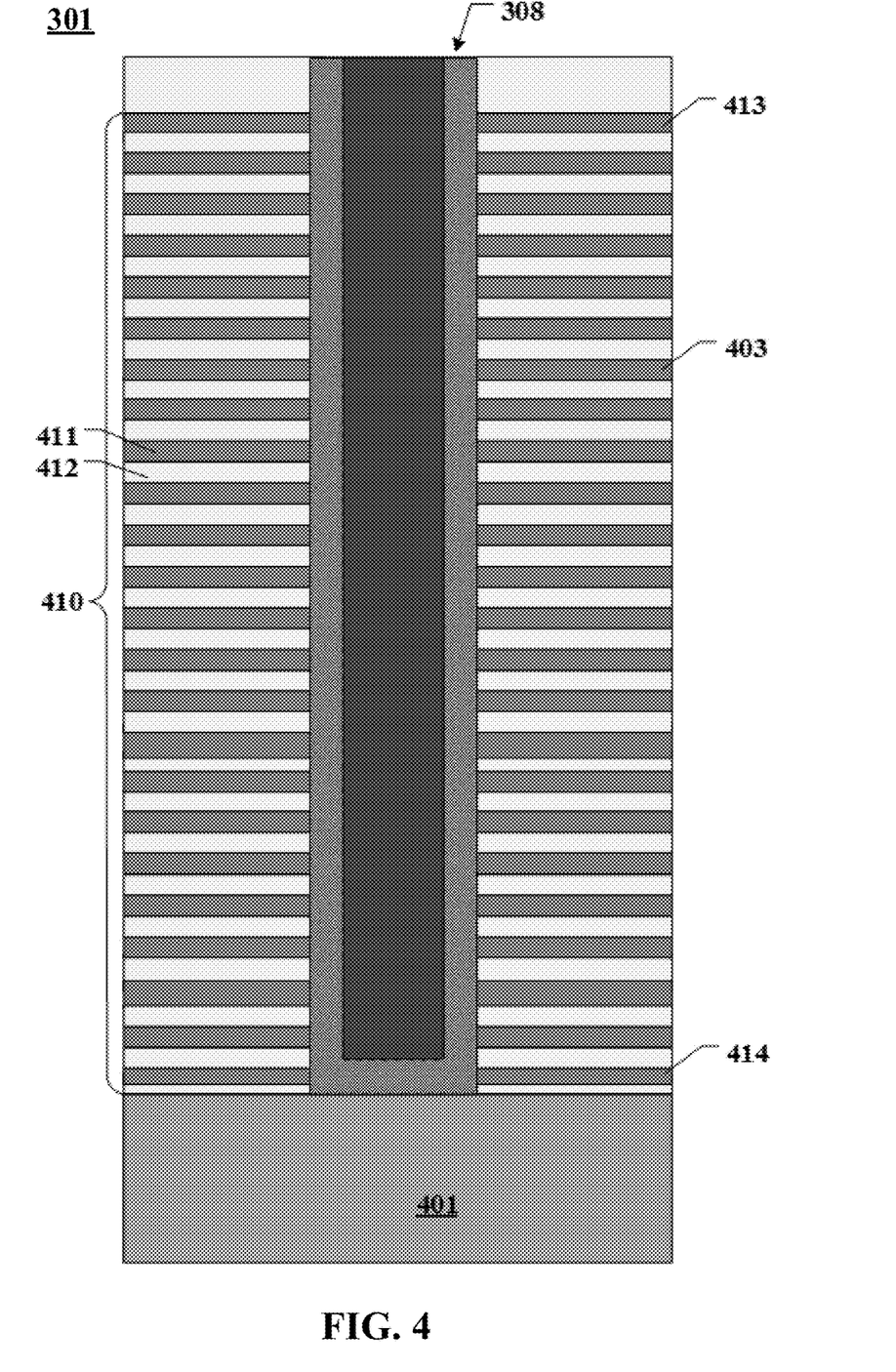
FIG. 4 is a schematic diagram illustrating an exemplary NAND string, according to implementations of the present disclosure.

FIG. 4 illustrates a side view of a section of an exemplary memory array 301 including a NAND memory string 308 according to some aspects of implementations of the present disclosure. As shown in FIG. 4, The NAND memory string 308 may include a stack structure 410 which comprises a plurality of gate layers 411 and a plurality of insulation layers 412 that are disposed in stacks alternately and sequentially, and a memory string 308 penetrating through the gate layers 411 and the insulation layers 412 vertically. The gate layers 411 and the insulation layers 412 may be stacked alternately, and two adjacent ones of the gate layers 411 are separated by one insulation layer 412. The number of pairs of the gate layers 411 and the insulation layers 412 in the stack structure 410 may determine the number of memory cells that are included in the memory array 301.

The constituent material of the gate layers 411 may include a conductive material, including, but not limited to, tungsten (W), cobalt (Co), copper (Cu), aluminum (Al), polysilicon, doped silicon, silicides, or any combination thereof. In some implementations, each gate layer 411 comprises a metal layer, e.g., a tungsten layer. In some implementations, each gate layer 411 comprises a doped polysilicon layer. Each gate layer 411 may comprise a control gate around the memory cells. The gate layer 411 at the top of the stack structure 410 may extend laterally as an upper select gate line; the gate layer 411 at the bottom of the stack structure 410 may extend laterally as a lower select gate line; and the gate layers 411 that extend laterally between the upper select gate line and the lower select gate line may act as word line layers.

In some implementations, the stack structure 410 may be disposed on a substrate 401. The substrate 401 may include silicon (e.g., single crystalline silicon), silicon germanium (SiGe), gallium arsenide (GaAs), germanium (Ge), silicon on insulator (SOI), germanium on insulator (GOI), or any other suitable materials.

In some implementations, the NAND memory string 308 comprises a channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer including a tunneling layer, a storage layer (also known as a "charge trap/storage layer"), and a blocking layer. The channel structure may have a cylindrical shape, e.g., a pillar shape. According to some implementations, the semiconductor channel, the tunneling layer, the storage layer, and the blocking layer are arranged radially from the center toward the outer surface of the pillar in this order. The tunneling layer can include silicon oxide, silicon oxynitride, or any combination thereof. The storage layer can include silicon nitride, silicon oxynitride, or any combination thereof. The blocking layer can include silicon oxide, silicon oxynitride, a high dielectric constant (high-k) dielectric, or any combination thereof. In one example, the memory film can include a composite layer of silicon oxide/silicon oxynitride/silicon oxide (ONO).

Figure 5:
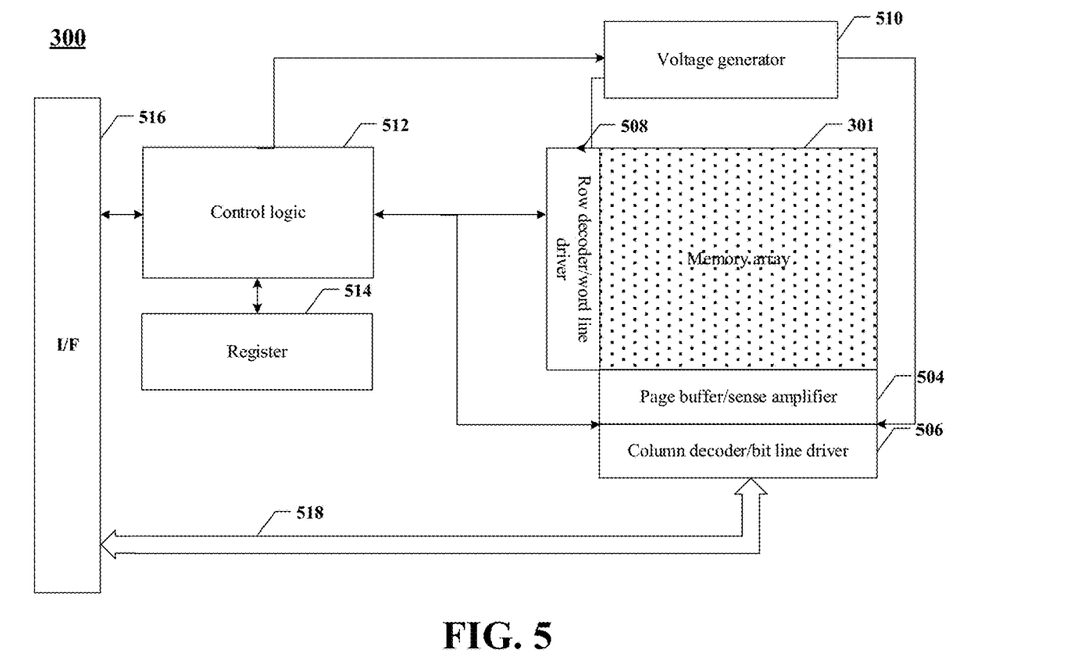
FIG. 5 is a schematic diagram illustrating an exemplary memory device comprising a memory array and a peripheral circuit, according to implementations of the present disclosure.

Referring back to FIG. 3, the peripheral circuit 302 may be coupled to the memory array 301 through bit lines 316, word lines 318, source lines 314, SSG lines 315 and DSG lines 313. The peripheral circuit 302 may include any suitable analog, digital, and hybrid signal circuits for facilitating the operations of the memory array 301 by applying and sensing voltage signals and/or current signals to and from each target memory cell 306 via the bit lines 316, the word lines 318, the source lines 314, the SSG lines 315, and the DSG lines 313. The peripheral circuit 302 may include various types of peripheral circuits formed using a metal-oxide-semiconductor (MOS) technology. For example, FIG. 5 illustrates some exemplary peripheral circuits. The peripheral circuit 302 includes a page buffer/sense amplifier 504, a column decoder/bit line driver 506, a row decoder/word line driver 508, a voltage generator 510, a control logic 512, a register 514, an interface 516, and a data bus 518. It is understood that in some examples, additional peripheral circuits not shown in FIG. 5 may be included as well.

The page buffer/sense amplifier 504 may be configured to read and program (write) data from and to the memory array 301 according to control signals from the control logic 512. In one example, the page buffer/sense amplifier 504 may store one page of program data (write data) to be programmed into one page 320 of the memory array 301. In another example, the page buffer/sense amplifier 504 may perform programming verify operations to ensure that the data has been properly programmed into the memory cells 306 that are coupled to the selected word lines 318. In yet another example, the page buffer/sense amplifier 504 may also sense low power signals from the bit lines 316 that represent data bits stored in the memory cells 306, and amplify small voltage swings to identifiable logic levels in read operations. The column decoder/bit line driver 506 may be configured to be controlled by the control logic 512 and select one or more NAND memory strings 308 by applying bit line voltages generated from the voltage generator 510.

The row decoder/word line driver 508 may be configured to be controlled by the control logic 512 and select/unselect the blocks 304 of the memory array 301 and select/unselect the word lines 318 of the blocks 304. The row decoder/word line driver 508 may be further configured to drive the word lines 318 using word line voltages generated from the voltage generator 510. In some implementations, the row decoder/word line driver 508 may also select/unselect and drive the SSG lines 315 and the DSG lines 313. As described below in detail, the row decoder/word line driver 508 is configured to perform erasing operations on the memory cells 306 that are coupled to (one or more) selected word lines 318. The voltage generator 510 may be configured to be controlled by the control logic 512 and generate a word line voltage (such as, a read voltage, a program voltage, a pass voltage, a local voltage, a verify voltage, etc.), a bit line voltage and a source line voltage to be supplied to the memory array 301.

The control logic 512 may be coupled to each peripheral circuit described above and configured to control the operations of each peripheral circuit. The register 514 may be coupled to the control logic 512 and include a state register, a command register, and an address register for storing state information, command operation codes (OP codes), and command addresses for controlling the operations of each peripheral circuit. The interface 516 may be coupled to the control logic 512, and act as a control buffer to buffer and relay control commands received from a host (not shown) to the control logic 512 and state information received from the control logic 512 to the host. The interface 516 may also be coupled to the column decoder/bit line driver 506 via a data bus 518 and act as a data I/O interface and a data buffer to buffer and relay the data to and from the memory array 301.

In some implementations, when the system 100 is running, the host 108 sends commands to the memory system 102 to obtain data from the memory system 102 or store data into the memory system 102, in response to usage demands of a user. The host 108, when processing task demands from the user, needs to perform data interaction with the memory system 102, and devices in the memory system 102 such as the memory controller 106, the memory devices 104 and various interfaces, are in a high load working state. At this point, the memory system 102 may be defined as in an activation mode. According to the current task demands of the user and the running logic of programs, a task processed by the host 108 may include a foreground task and a background task, which correspond to an Active Foreground mode and an Active Background mode of the memory system 102 respectively. The foreground task is a process that is being run by the current window or current taskbar of the host 108; the process can receive various commands of the current user through an input apparatus (e.g., a keyboard, a mouse, a speech sensor, etc.), and can perform prioritized execution on these commands and give a feedback to the user through an output apparatus, e.g., a display. The background task may exit the current window or taskbar for suspension, and the current user does not perform real-time command input on this task. The foreground task and the background task may be switched arbitrarily according to the demands. The activation mode may include multiple working modes, for example, the first activation mode may be the Active Foreground mode, and the second activation mode may be the Active Background mode; alternatively, the first activation mode may be the Active Background mode, and the second activation mode may be the Active Foreground mode.

It is understood that regardless of whether the memory system 102 is in the first activation mode or the second activation mode, the memory controller 106 needs to control the memory devices 104 to perform reading, writing, erasing or other operations of the data to meet the command demands of the host 108. Therefore, the power consumption of the memory system may be equal in both activation modes. In order to meet better sequential read-write speeds and random read-write speeds of the memory devices 104 and high bandwidth transmission performance of the bus interface, a power supply module is required to provide higher power consumption. When the host 108 has no foreground task or no background task to execute, if the memory system 102 still maintains the first activation mode or the second activation mode, there will be high power consumption, and such power consumption is not used for data transmission of the memory system 102. When the memory system 102 is applied to a system or a terminal without an external power supply or without a sustainable power supply, such as a personal computer, a digital camera, a mobile phone, a wearable apparatus and the like, which need to be powered by applying an internal energy storage power supply of the system, a large amount of electric energy will be wasted, resulting in a reduction of the standby time of the system and deterioration of user experience.

Figure 6:
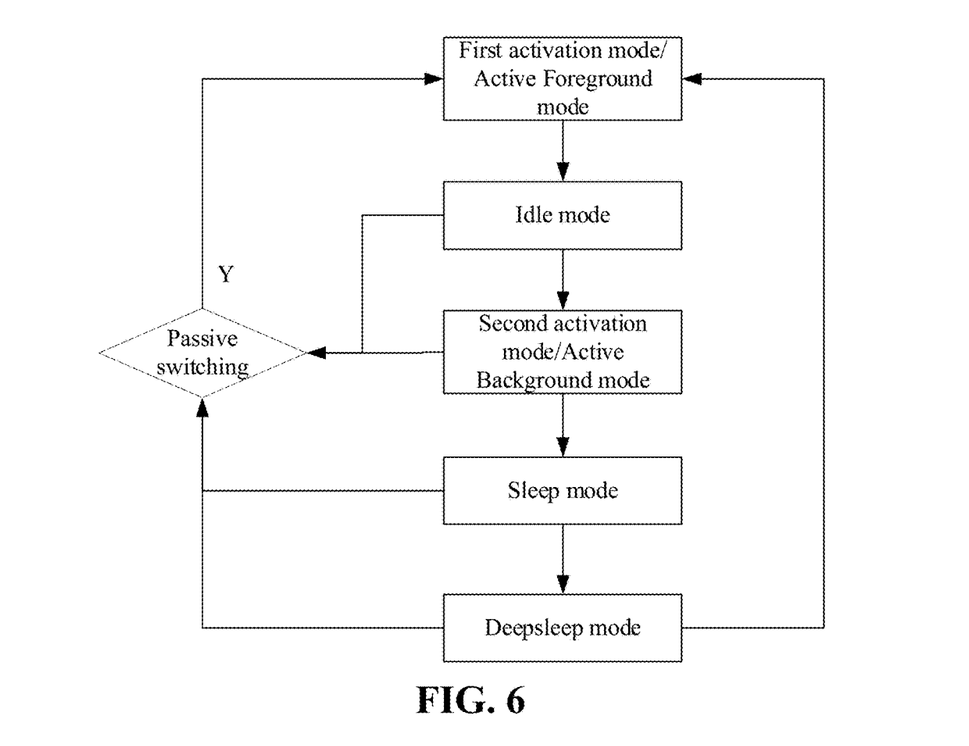
FIG. 6 is a flow diagram illustrating working mode switching of a memory system, according to an exemplary implementation of the present disclosure.

In this regard, an exemplary implementation of the implementations of the present disclosure provides a memory system 102 which comprises: a memory controller 106 and at least one memory device 104 coupled with the memory controller 106, where the memory system 102 can respond to an instruction of a host 108. FIG. 6 illustrates a flow diagram that the memory controller 106 controls the memory system 102 to switch working modes. Referring to FIG. 6, the memory controller 106 is configured to:

control the memory system 102 to enter a first activation mode (an Active Foreground mode), an Idle mode, a second activation mode (an Active Background mode), a Normal Sleep mode and a Deep Sleep mode sequentially, which is one task running cycle, where the memory system 102 may execute the task running cycle cyclically. It is noted that when the host 108 receives a task demand of the current user, the memory controller 106 may receive an instruction of the host 108 to passively switch to the first activation mode from any working mode to respond to a data request of the host 108. The memory system 102 at this point may maintain the first activation mode until the data transmission is finished. In some other implementations, the memory controller 106 may control the memory system 102 to skip the idle mode to enter any working mode after executing the first activation mode.

In some implementations, the memory controller 106 may comprise a power management module that is configured to control the memory system 102 to switch the working modes. In some other implementations, the power management module may be integrated outside the memory controller 106 to provide various voltages and power-on and power-off processing for the whole memory system 102.

Figure 7:
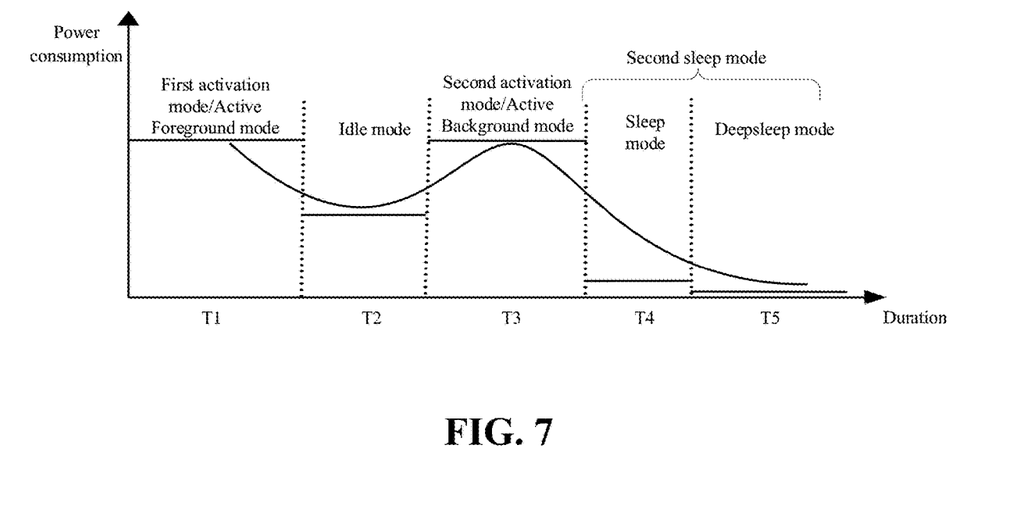
FIG. 7 is a schematic diagram illustrating duration and power consumption of a memory system in different working modes, according to an exemplary implementation of the present disclosure.

The duration and power consumption of each working mode (or power mode) of the memory system 102 are different; as shown in FIG. 7. By taking the first activation mode as an example, its duration is T1, and the power consumption is a product of the power and the duration. The curve in FIG. 7 reflects a variation trend of the power consumption of the memory system 102 in various working modes, does not represent a real-time variation of the power consumption at different time nodes, and only represents a relative scale of the power consumption in various working modes. The power consumption of various working modes may also be a mean value or a numerical range. For ease of explanation and illustration, the relevant parameters of various working modes of the memory system 102 in an exemplary implementation as shown in FIG. 7 are summarized in Table 1. The data in Table 1 are tested in the same test system or the same test platform according to relevant testing standards. It is noted that various data as shown in Table 1 are only exemplary data of some test system, and the data are only used to show relative values between the modes. For the data corresponding to various modes in the implementations of the present disclosure, it is understood that the numerical values may have relative variations in different test systems.

TABLE 1

| Working mode | Response delay | Power | Duration ratio | Relative power consumption |
| --- | --- | --- | --- | --- |
| First activation mode (Active Foreground mode) | 10 | 700 | 2 | 1400 |
| Second activation mode (Active Background mode) | 10 | 700 | 1 | 700 |
| Idle mode | 10 | 300 | 20 | 6000 |
| Sleep mode | 200 | 13 | 100 | 1300 |
| Deep Sleep mode | 1200 | 2 | 400 | 800 |
| Total | 1430 | 1715 | 523 | 10200 |

The first activation mode and the second activation mode may be working modes in which the memory system 102 and the host 108 perform data interaction. The memory controller 106, the memory devices 104 and communication interfaces with the host 108 are all in a normal load state to meet quick response demands of the memory system 102, and therefore, these working modes have a minimum response delay and maximum power.

Generally, the idle mode is a state just after the memory system 102 finishes all of operations being executed, and may act as a transition mode between the first activation mode and the second activation mode. At this point, the memory controller 106 has neither a command from the host 108 nor a background task to process by itself. The power-on states of various devices of the memory system 102 are the same as the first activation mode and the second activation mode, such that the response delay of the idle mode is the same as that of the first activation mode and the second activation mode. However, since there is no data transmission, its components are in a power-on non-running state, and its power is less as compared with the activation modes. In some implementations, when the memory system 102 is in the first activation mode or the second activation mode, the memory system is in a high-speed transmission mode to provide quick data interaction demands for the host 108. When the memory system 102 is in the idle mode, the memory controller 106 may control the memory system 102 to enter a low-speed transmission mode to reduce the power of its interface with the host 108 to reduce the power consumption, but still keep powered on to maintain a quick response speed.

In some implementations, the power management module of the memory system 102 may provide three power supply voltages: VCC, VCCQ and VCCQ2, to supply power to different devices in the memory system 102 respectively. For example, VCC supplies power to the memory devices, VCCQ generally supplies power to input/output interfaces of the memory devices and the memory controller 106, and VCCQ2 generally supplies power to a front end interface and some other low voltage modules. Corresponding to FIGS. 1 and 5 in the implementations of the present disclosure, VCC supplies power to the memory arrays 301, VCCQ supplies power to the memory controller 106, the interface 516 or the data bus 518, and VCCQ2 supplies power to an interface (not numbered in the figure) between the host 108 and the memory system 102 in FIG. 1. In some specific examples, the memory system 102 may be a Universal Flash Storage UFS apparatus. VCC supplies power to the memory devices (the memory arrays) at a voltage of 1.7 V to 3.6 V; VCCQ supplies power to a UFS controller at a voltage of 1.1 V to 1.3 V; and VCCQ2 supplies power to a front end UFS interface M-PHY at a voltage of 1.7 V to 1.95 V. It is noted that the memory system 102 performing different package or interface protocols will have different power supply voltages, and the above-mentioned voltage ranges are only illustrative.

In some implementations, VCC, VCCQ and VCCQ2 in the first activation mode and the second activation mode are all powered on; VCC, VCCQ and VCCQ2 in the idle mode are all powered on at a lower voltage than the first activation mode to reduce the power; VCC in the Normal Sleep mode is cut off to reduce the power; and VCC, VCCQ and VCCQ2 in the Deep Sleep mode are all cut off to further reduce the power.

For example, the unit of the response delay in Table 1 may be ms; a smaller delay represents a higher response speed of the memory system 102. The unit of the power may be mW, and the above-mentioned delay and power may be rated values or mean values tested according to relevant testing standards. The duration ratio is the ratio of the duration of each working mode to the total duration in one task running cycle in which the first activation mode is automatically switched to the Deep Sleep mode in FIGS. 6 and 7. The relative power consumption is a product of the duration ratio and the power, i.e., the ratio of the duration of the five working modes in Table 1 is 2:1:20:100:400; the ratio of the relative power consumption is 1400:700:6000:1300:800. For example, the unit of the duration may be s; the duration of the five working modes in Table 1 may be 2 s, 1 s, 20 s, 100 s and 400 s respectively; and a total duration of one task running cycle is 523 s. This duration setting is only applicable to automatically cycled working mode switching in FIG. 6, and when the memory system 102 passively switches to the first activation mode, there is no need to refer to the duration setting of the first activation mode, and the automatically cycled switching is performed after the data transmission is finished. The duration of various working modes of the memory system 102 as shown in FIG. 7 and Table 1 may be preset duration that are set according to statistical analysis of usage behaviors of the user for the memory system 102.

In the implementations of the present disclosure, the duration ratios of the various working modes in one task running cycle are obtained by analyzing usage data of switching the working modes by the user. It is to be noted that, the automatic switching of the working modes of the memory system 102 as shown in FIG. 6 may be automatically cycled switching performed when the host 108 has no interaction with the memory system 102. If the host 108 has data interaction with the memory system 102, the first activation mode or the second activation mode will be maintained, and the cycled switching process as shown in FIG. 6 will be started after the data transmission is finished.

In some implementations, in a process that the memory system 102 performs the working state switching as shown in FIG. 6, when the memory system 102 is in the first activation mode or the second activation mode, if the memory controller 106 just receives running foreground tasks or background tasks, there will be data interaction between the memory system 102 and the host 108. If the duration of the task at this point is just within the duration of the first activation mode or the second activation mode, there is no need to perform passive switching, and the memory system 102 may perform it according to the sequence of the flow diagram as shown in FIG. 6. If the duration of the task at this point exceeds the duration of the first activation mode or the second activation mode, the memory system 102 is not required to perform it according to the flow diagram as shown in FIG. 6, and the switching procedure as shown in FIG. 6 is performed after its data transmission is finished.

In some implementations, when there is no data transmission between the memory system 102 and the host 108, i.e., the memory system 102 is in the idle state, the memory controller 106 controls the memory system 102 to switch the working mode to be standby along the automatic switching procedure as shown in FIG. 6. When the memory system 102 is in the first activation mode or the second activation mode, there is also no data transmission between the memory system 102 and the host 108. However, if the memory system 102 is just in the first activation mode or the second activation mode, the host 108 receives a user task, and the response delay of the memory system 102 in this state is smaller as compared with the Normal Sleep mode to achieve quick data transmission, regardless of whether it passively switches to the first activation mode or directly performs data access.

In some implementations, the memory controller 106 may control the memory system 102 to automatically switch various working modes through the flow diagram as shown in FIG. 6 to save apparatus resources of the memory system 102 in order to prepare for a next foreground task according to a command of the host 108 or at its own discretion when a portion of the foreground task in the first activation mode has been performed and the current foreground task is no longer current urgently-needed data by the user. The data that has not been transmitted in the first activation mode may be completed in the form of a background task in the second activation mode to save the bandwidth for the data transmission and reduce the running burden of the memory controller 106 and the data interfaces when multiple foreground tasks are executed at the same time.

For example, by taking the Universal Flash Storage UFS apparatus as an example, when the user needs to run a first program, the memory controller 106 accesses the memory devices 104 under the instruction of the host 108. Immediately after checking a UI interface of the program, the user stops continuing operations, closes a display window (but does not exit the first program) or operates other programs (a second program). However, at this point, the data of the first program still continues being loaded; at this point, the memory controller 106 may control the memory system 102 to enter the idle mode or directly enter the second activation mode, continue running the first program as a background task, and enter the Normal Sleep mode or the Deep Sleep mode after the execution is finished. When the power for maintaining the running of the memory system 102 is low, the memory controller 106 may also control the memory system 102 to exit the Active Background mode and enter the Normal Sleep mode or the Deep Sleep mode to reduce the power consumption and save the power for the next Active Foreground mode.

With continued reference to Table 1, in the idle mode, the memory system 102 has no data interaction with the host 108, and its power is 23 times as much as that of the Normal Sleep mode. Its duration ratio may be reduced properly and allocated to the Normal Sleep mode or the Deep Sleep mode to reduce the power consumption.

According to some aspects of the implementations of the present disclosure, a memory system 102 is provided, which comprises: a memory controller 106 and at least one memory device 104 coupled with the memory controller 106; the memory system 102 can respond to an instruction of a host 108, and the memory controller 106 is configured to:

control the memory system 102 to enter a first activation mode and a transition mode, wherein the transition mode includes an idle mode and a first sleep mode; the power of the memory system 102 in the first sleep mode is less than the power of the memory system 102 in the idle mode; and the power of the memory system 102 in the idle mode is less than the power of the memory system 102 in the first activation mode.

In some implementations, the memory controller 106 is further configured to: control the memory system 102 to enter a second activation mode and a second sleep mode sequentially after the transition mode, wherein the power of the second sleep mode is less than that of the second activation mode. In the implementations of the present disclosure, the power of the Normal Sleep modes (including the first sleep mode and the second sleep mode) is less than that in idle mode, and the power of the idle mode is less than that of the activation modes (including the first activation mode and the second activation mode).

Figure 8:
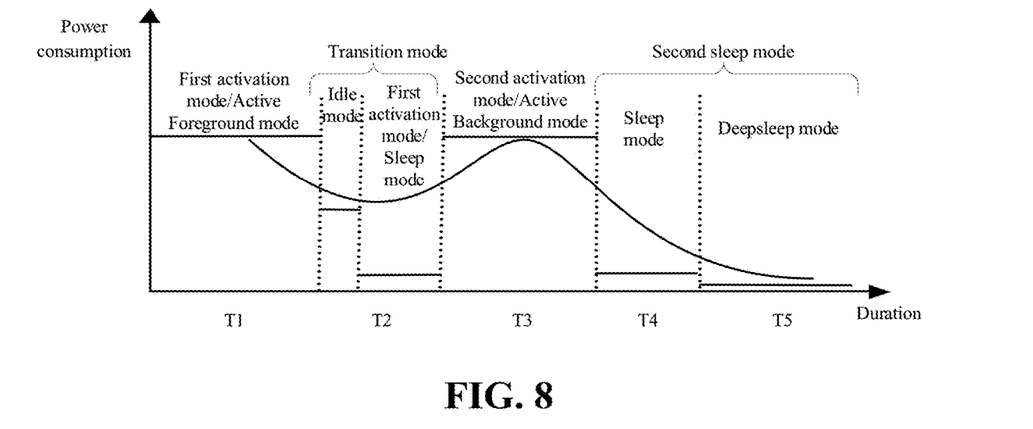
FIG. 8 is a schematic diagram illustrating duration and power consumption of a memory system in different working modes, according to implementations of the present disclosure.

In particular, referring to what is shown in FIG. 8, different from FIG. 7, the implementation of the present disclosure sets the idle mode and the first sleep mode between the first activation mode and the second activation mode, and the idle mode and the first sleep mode act as the transition mode between the two activation modes. By comparing FIG. 7 with FIG. 8, the duration of the transition mode in FIG. 8 is T2, which is identical to the duration of the idle mode in FIG. 8. That is, a portion of the duration of the idle mode in FIG. 7 is allocated for performing the first sleep mode; the power of the first sleep mode is less than the power of the idle mode, and the power consumption of the memory is reduced in the condition of not changing the transition duration T2 between the first activation mode and the second activation mode. For example, the duration of the idle mode as shown in FIG. 8 is T6, the duration of the first sleep mode is T7, and T2 is a sum of T6 and T7. For example, the first sleep mode may include a Normal Sleep mode or a Deep Sleep mode.

In the implementations of the present disclosure, by statistical analysis of usage behaviors of the user for the memory system 102, it is found that artificial switching of the memory system 102 from the idle mode to the first activation mode (the Active Foreground mode) by the user is mainly concentrated in a period of time before the first activation mode is finished. That is to say, the memory system 102 will enter the idle mode after the first activation mode is finished, and will passively switch back to the first activation mode after lasting for a short time in the idle mode. In this usage scenario, if a too long idle mode is set between the first activation mode and the second activation mode, the power consumption of the memory system 102 will be increased. The implementations of the present disclosure can decrease the duration of the idle mode to reduce the power consumption of the memory system 102. The implementations of the present disclosure reduce the duration ratio of the idle mode in the transition mode to reduce the power consumption, and do not limit the working mode switching and duration setting after the transition mode. FIG. 8 provides an exemplary illustration.

Taking FIG. 8 as an example, the transition mode of duration T2 is set between the first activation mode and the second activation mode. When the duration of the transition mode is allocated, a first portion of the duration may be allocated to the idle mode, a second portion of the duration may be allocated to the first sleep mode, and an execution sequence is sequentially the first activation mode, the idle mode, the first sleep mode and the second activation mode. As such, the usage scenario of most users that the memory system is switched back to the first activation mode (the Active Foreground mode) or switched to the second activation mode (the Active Background mode) after short duration in the idle mode can be met. While the short response delay of the memory system 102 is maintained for quick activation, the power consumption is reduced and the standby duration of the memory system 102 is increased through the lower-power first sleep mode.

In some implementations, the first sleep mode in the transition mode in FIG. 8 may be directly canceled. At this point, the transition mode only includes the idle mode of which the duration is less than T2.

In some implementations, the first sleep mode may be either the Normal Sleep mode or the Deep Sleep mode, and the second sleep mode may be any one of the Normal Sleep mode and the Deep Sleep mode, or a combination of the two sleep modes. For example, the first sleep mode in FIG. 8 is the Normal Sleep mode, and the second sleep mode is a combination of the Normal Sleep mode with the duration of T4 and the Deep Sleep mode with the duration of T5.

Figure 9:
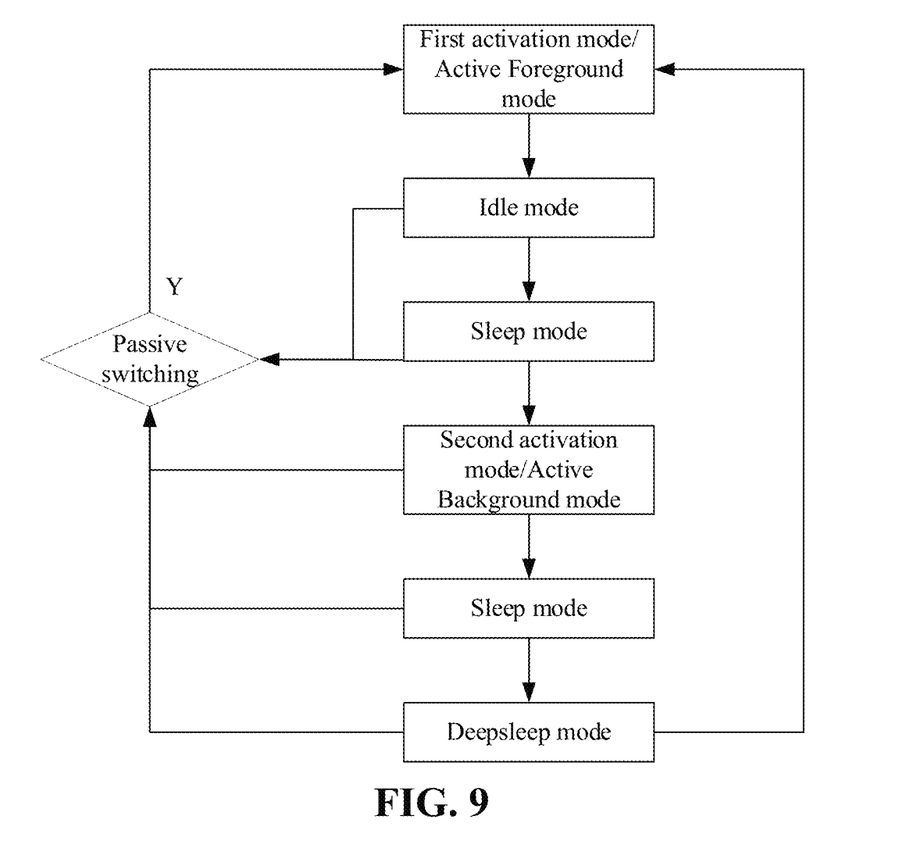
FIG. 9 is a flow diagram illustrating working mode switching of a memory system, according to implementations of the present disclosure.

FIG. 9 illustrates a flow diagram of working mode switching of a memory system 102 in implementations of the present disclosure. Referring to FIG. 9, a memory controller 106 of the implementation of the present disclosure is configured to control the memory system 102 to enter a first activation mode (an Active Foreground mode), an Idle mode, a Normal Sleep mode, a second activation mode (an Active Background mode), a Normal Sleep mode and a Deep Sleep mode sequentially, which is one task running cycle that may be executed cyclically.

For ease of explanation and illustration, the relevant parameters of the memory system 102 in various working modes in an implementation as shown in FIGS. 8 and 9 are summarized in Table 2. The data in Table 2 are tested in the same test system or the same test platform according to relevant testing standards. The data are relative values, and the values in different test systems may vary relatively. The representations and interpretations of various data in Table 2 are the same as those in Table 1, which is not repeated here.

TABLE 2

| Working mode | Response delay | Power | Duration ratio | Relative power consumption |
|---|---|---|---|---|
| First activation mode (Active Foreground mode) | 10 | 700 | 2 | 1400 |
| Second activation mode (Active Background mode) | 10 | 700 | 1 | 700 |
| Idle mode | 10 | 300 | 2 | 600 |
| Normal Sleep mode | 200 | 13 | 118 | 1534 |
| Deep Sleep mode | 1200 | 2 | 400 | 800 |
| Total | 1430 | 1715 | 523 | 5034 |

As shown in Table 2, one task running cycle of the implementation of the present disclosure is the same as the task running cycle in Table 1, and the total duration ratios of all the working modes are 523. The duration ratio of the idle mode in Table 2 is reduced by 18 as compared with the idle mode of Table 1, and the duration ratio of the Normal Sleep mode in Table 2 is increased by 18 as compared with the Normal Sleep mode of Table 1, because under the condition that the implementation of the present disclosure keeps the total duration ratios of the task running cycle unchanged, the idle mode with the duration ratio of 18 in Table 1 is set as the Normal Sleep mode, and correspondingly, the duration ratio of the first activation mode to the idle mode to the Normal Sleep mode to the second activation mode to the Normal Sleep mode to the Deep Sleep mode in FIG. 9 is 2:2:18:1:100:400. At this point, the total relative power consumption is 5034, which is reduced by 50.6% as compared with the total relative power consumption of 10200 in Table 1, thereby being beneficial to increase the standby duration of the memory system 102. In some implementations, the idle mode with the duration ratio of 18 in Table 1 is set as the Deep Sleep mode, and the power consumption will be further reduced.

In some implementations, with continued reference to FIG. 9, in addition to a cycling procedure that the memory controller 106 controls the memory system 102 to switch the working modes automatically, FIG. 9 further illustrates that when the host 108 receives a task demand of a current user, the memory controller 106 controls the memory system 102 to passively switch to the first activation mode from any working mode to respond to a data request of the host 108, and at this point the memory system 102 may maintain the first activation mode until the data transmission is completed.

In some implementations, the memory controller 106 may control the memory system 102 to enter any mode after executing the first activation mode. The memory controller 106 may control the memory system 102 to automatically switch from the first activation mode to other working modes through the flow diagram as shown in FIG. 9 to save apparatus resources of the memory system 102 in order to prepare for a next foreground task according to a command of the host 108 or at its own discretion when a portion of the foreground task in the first activation mode has been performed and the current foreground task is no longer current urgently-needed data by the user. The data transmission that has not been completed in the first activation mode may be completed in the form of a background task in the second activation mode to save the bandwidth for the data transmission and reduce the running burden of the memory controller 106 and the data interfaces when multiple foreground tasks are executed at the same time.

In some implementations, in a process that the memory system 102 performs the working state switching as shown in FIG. 9, when the memory system 102 is in the first activation mode or the second activation mode, if the memory controller 106 just receives running foreground tasks or background tasks, there will be data interaction between the memory system 102 and the host 108.

In some implementations, when there is no data transmission between the memory system 102 and the host 108, i.e., the memory system 102 is in the idle state, the memory controller 106 controls the memory system 102 to switch a working state to be standby along the automatic switching procedure as shown in FIG. 9. When the memory system 102 is in the first activation mode or the second activation mode, there is also no data transmission between the memory system 102 and the host 108. However, if the memory system 102 is just in the first activation mode or the second activation mode, the host 108 receives a user task, and the response delay of the memory system 102 in this state is small, regardless of whether the memory system 102 passively switches to the first activation mode or directly performs data access.

In some implementations, the ratio of the duration that the idle mode maintains to the duration that the first sleep mode maintains is determined according to historical data of the memory system 102 switching from the idle mode to the first activation mode.

In this implementation, the duration of the memory system 102 in various working modes is established by statistical analysis of usage behaviors of the user for the memory system 102. In the idle mode, the memory system 102 has no data interaction with the host 108, and its power is 23 times as much as that of the Normal Sleep mode, and 150 times that of the Deep Sleep mode. Moreover, it is found from statistical data that, the artificial switching of the memory system 102 from the idle mode to the first activation mode (the Active Foreground mode) by the user is mainly concentrated in a period of time before the first activation mode is finished. That is to say, the memory system 102 will enter the idle mode after the first activation mode is finished, and will passively switch back to the first activation mode after lasting for a short time in the idle mode. The probability of passively switching back to the first activation mode after lasting for a long time in the idle mode is low. Therefore, the duration ratio of the idle mode may be reduced properly and set as that of the first sleep mode to reduce the power consumption, where the first sleep mode may include the Normal Sleep mode and the Deep Sleep mode. The duration of various working modes of the memory system 102 as shown in FIG. 7 and Table 1 may be preset duration that is set according to statistical analysis of usage behaviors by the user for the memory system 102.

In some implementations, the duration that the first sleep mode maintains is longer than the duration that the idle mode maintains.

The idle mode is executed before the first sleep mode, and the relatively short duration allocated to the idle mode can meet the usage scenario that most users switch back to the first activation mode or to the second activation mode (the Active Background mode) after short duration in the idle mode. While the short response delay of the memory system 102 is maintained to achieve quick activation, the power consumption is reduced by the lower power first sleep mode, and the standby duration of the memory system 102 is increased.

In some implementations, the ratio of the duration that the idle mode maintains to the duration that the first sleep mode maintains is 1:9.

For example, as shown in FIG. 8 and Table 2, the duration ratio of the idle mode to the first sleep mode is 2:18, which is a value determined based on the statistical analysis of usage behaviors of the user for the memory system 102, and different memory systems 102 and different statistical analysis models will have different optimized values.

In some implementations, the second sleep mode includes a Normal Sleep mode and a Deep Sleep mode, and the first sleep mode is the Normal Sleep mode, wherein the power of the memory system 102 in the Deep Sleep mode is less than the power of the memory system 102 in the Normal Sleep mode.

The memory controller 106 is configured to: control the memory system 102 to enter the Normal Sleep mode first, maintain the Normal Sleep mode for a period of time, and then enter the Deep Sleep mode in a process of entering the second sleep mode.

Referring to what is shown in Table 2, the response delay of the Normal Sleep mode is less than that of the Deep Sleep mode, and the power consumption of the Deep Sleep mode is less than that of the Normal Sleep mode. In combination with what is shown in FIG. 8, the implementations of the present disclosure set the first sleep mode as the Normal Sleep mode, which is beneficial to reduce the power consumption as compared with the idle mode and may obtain a relatively small response delay, i.e., it is beneficial to passively switch back to the first activation mode quickly and also beneficial to automatically switch to the second activation mode. The stage after the second activation mode is at the end of one task running cycle, the data interaction needed by program running may finish the transmission in the Active Foreground mode and the Active Background mode, and the second sleep mode may be any one of the Normal Sleep mode and the Deep Sleep mode, or a combination of both.

In FIG. 8, the implementation of the present disclosure switches to the Normal Sleep mode first and then switches to Deep Sleep mode, with a duration ratio of 100:400. The Normal Sleep mode with low response delay and high power consumption is set to a shorter duration ratio and switched first, which is beneficial to reduce the response delay while obtaining relatively low power consumption.

In some implementations, the memory controller 106 is configured to: cut off power supplies of the memory devices 104 when the memory system 102 is in the Normal Sleep mode.

In some implementations, when the memory system 102 is in the Normal Sleep mode, the memory controller 106 cuts off all power supplies of the memory devices 104, i.e., cuts off all power supplies of every apparatus of the memory devices 104 in FIG. 1, including all devices such as the control logic 512, the voltage generator 510 and the memory array 301, etc. as shown in FIG. 5. In some implementations, when the memory system 102 is in the Normal Sleep mode, the memory controller 106 only cuts off the power supply of the memory array 301. In some further implementations, when the memory system 102 is in the Normal Sleep mode, the memory controller 106 may cut off the power supplies of the memory devices 104 according to voltages, for example, cut off VCC voltages in the memory devices 104. At this point, the memory controller 106 still keeps powered on, and the communication interface between the memory controller 106 and the host 108 also keeps powered on. In some particular implementations, regardless of whether the memory controller 106 or the memory array 301 is powered off, the memory controller 106 controls the memory devices 104 to finish storing the data stored in the memory array to avoid data loss. Some data may also be stored in a dynamic random access memory (DRAM) integrated in or external to the memory controller 106 to be called quickly when the memory system 102 is switched to the first activation mode or the second activation mode to reduce the response delay.

In some implementations, the memory controller 106 is configured to: store the current data into the memory devices 104 before the memory system 102 enters the Deep Sleep mode.

In some implementations, the memory controller 106 is configured to: cut off the power supplies of the memory devices 104, the power supply of an interface between the memory controller 106 and the host 108, and the power supply of the memory controller 106, when the memory system 102 is in the Deep Sleep mode.

As compared with the Normal Sleep mode in which only the power supplies of the memory devices 104 are cut off, on this basis, the Deep Sleep mode may further cut off the power supply of the communication interface between the memory controller 106 and the host 108, and the power supply of the memory controller 106 itself, for example, cut off VCC, VCCQ and VCCQ2 voltages; and at this point, the memory system 102 reaches the minimum power. As can be seen, after the memory system 102 enters the Deep Sleep mode, a control portion and a storage portion of the memory system 102 are both powered off and are in an off-line state.

Therefore, before the memory system 102 enters the Deep Sleep mode, the memory controller 106 needs to store the currently running data of the memory system 102 into the memory arrays 301 of the memory devices 104 to avoid data loss caused by power failure. These data include, but not limited to, system data running in a register of the memory controller 106, data (e.g., a logical address-physical address mapping table) temporarily stored in the DRAM, and data that has not been transmitted in various communication interfaces such as the interface 516 or the data bus 518, etc.

In some implementations, the memory system 102 comprises a Universal Flash Storage UFS apparatus.

According to some aspects of the implementations of the present disclosure, an operation method of a memory system 102 is provided, which comprises the following steps: a memory controller 106 controls the memory system 102 to enter a first activation mode and a transition mode, wherein the transition mode includes an idle mode and a first sleep mode; the power of the memory system 102 in the first sleep mode is less than the power of the memory system 102 in the idle mode; and the power of the memory system 102 in the idle mode is less than the power of the memory system 102 in the first activation mode.

In some implementations, the operation method further comprises: the memory controller 106 controls the memory system 102 to enter a second activation mode and a second sleep mode sequentially after the transition mode, wherein the power of the second sleep mode is less than the power of the second activation mode.

In some implementations, FIG. 9 illustrates a flow diagram of working mode switching of a memory system 102 in implementations of the present disclosure. Referring to FIG. 9, a memory controller 106 is configured to control the memory system 102 to enter a first activation mode (an Active Foreground mode), an Idle mode, a Normal Sleep mode, a second activation mode (an Active Background mode), a Normal Sleep mode and a Deep Sleep mode sequentially, which is one task running cycle that may be executed cyclically.

In addition to a cycling procedure that the memory controller 106 controls the memory system 102 to switch the working modes automatically, FIG. 9 further illustrates that when a host 108 receives a task demand of a current user, the memory controller 106 may receive an instruction of the host 108 to passively switch to the first activation mode from any working mode to respond to a data request of the host 108. The memory system 102 at this point may maintain the first activation mode until the data transmission is completed. The memory controller 106 in the implementations of the present disclosure may not switch the working modes according to the operation flow diagram as shown in FIG. 9, and may switch to any mode starting from the first activation mode.

In some implementations, the second sleep mode includes a Normal Sleep mode and a Deep Sleep mode; and the first sleep mode is the Normal Sleep mode, wherein the power of the memory system 102 in the Deep Sleep mode is less than the power of the memory system 102 in the Normal Sleep mode; the operation method comprises: the memory controller 106 controls the memory system 102 to enter the Normal Sleep mode first, maintain the Normal Sleep mode for a period of time, and then enter the Deep Sleep mode in a process of entering the second sleep mode.

In some implementations, the operation method comprises: the memory controller 106 cuts off power supplies of the memory devices 104 when the memory system 102 enters the Normal Sleep mode.

In some implementations, the operation method comprises: the memory controller 106 stores current data into the memory devices 104 before the memory system 102 enters the Deep Sleep mode.

In some implementations, the operation method comprises: the memory controller 106 cuts off power supplies of the memory devices 104, a power supply of an interface between the memory controller 106 and the host 108, and a power supply of the memory controller 106, when the memory system 102 enters the Deep Sleep mode.

According to some aspects of the implementations of the present disclosure, a power management module is provided, which is disposed on a first electronic apparatus that can respond to an instruction of a second electronic apparatus; the power management module is configured to: control the first electronic apparatus to enter a first activation mode and a transition mode sequentially, wherein the transition mode includes an idle mode and a first sleep mode; the power of the first electronic apparatus in the first sleep mode is less than the power of the first electronic apparatus in the idle mode; and the power of the first electronic apparatus in the idle mode is less than the power of the first electronic apparatus in the first activation mode.

In some implementations, the power management module is configured to: control the first electronic apparatus to enter a second activation mode and a second sleep mode sequentially after the transition mode, wherein the power of the second sleep mode is less than the power of the second activation mode.

Referring to FIG. 1, the first electronic apparatus of the implementations of the present disclosure may comprise a memory system 102; the second electronic apparatus may comprise a host 108; and in response to an instruction of the host 108, the memory system 102 may provide a data demand to the host 108 according to the instruction of the host 108.

In some implementations, the power management module may be integrated in the memory controller 106 and is configured to control the memory system 102 to switch the working modes. In some other implementations, the power management module may be integrated outside the memory controller 106, and the power management module receives a supply voltage and provides voltages and power-on and power-off processing for various devices of the whole memory system 102 through voltage transformation or phase inversion processing.

In some implementations, the ratio of the duration that the idle mode maintains to the duration that the first sleep mode maintains is determined according to historical data of the first electronic apparatus switching from the idle mode to the first activation mode.

In some implementations, the duration that the first sleep mode maintains is longer than the duration that the idle mode maintains.

In some implementations, the ratio of the duration that the idle mode maintains to the duration that the first sleep mode maintains is 1:9.

In some implementations, the second sleep mode includes a Normal Sleep mode and a Deep Sleep mode; and the first sleep mode is the Normal Sleep mode, wherein the power of the first electronic apparatus in the Deep Sleep mode is less than the power of the first electronic apparatus in the Normal Sleep mode; the power management module is configured to: control the first electronic apparatus to enter the Normal Sleep mode first, maintain the Normal Sleep mode for a period of time, and then enter the Deep Sleep mode in a process of entering the second sleep mode.

In some implementations, the power management module is configured to: cut off power supplies of functional devices in the first electronic apparatus when in the first sleep mode or the second sleep mode.

In particular, when the first electronic apparatus comprises the memory system 102, functional devices therein may include devices such as a memory controller 106, memory devices 104, communication interfaces, and the like. For example, the memory devices 104 may be the memory device 300 as shown in FIG. 5.

In some implementations, when the memory system 102 is in the Normal Sleep mode, the memory controller 106 cuts off all power supplies of the memory devices 104, i.e., cuts off all power supplies of every device of the memory devices 104 in FIG. 1, including all devices such as the control logic 512, the voltage generator 510 and the memory array 301 as shown in FIG. 5. In some implementations, when the memory system 102 is in the Normal Sleep mode, the memory controller 106 only cuts off power supplies of the memory arrays in the memory devices 104. In some further implementations, when the memory system 102 is in the Normal Sleep mode, the memory controller 106 may cut off the power supplies of the memory devices 104 according to voltages, for example, cut off VCC voltages in the memory devices 104. At this point, the memory controller 106 still keeps powered on, and the communication interface between the memory controller 106 and the host 108 also keeps powered on. In some particular implementations, regardless of whether the memory controller 106 or the memory array is powered off, the memory controller 106 controls the memory devices 104 to finish storing data stored in the memory array to avoid data loss. Some data may also be stored in a dynamic random access memory (DRAM) integrated in or external to the memory controller 106 to be called quickly when the memory system 102 is switched to the first activation mode or the second activation mode to reduce the response delay.

In some implementations, the power supplies of the memory devices 104, the interface between the memory controller 106 and the host 108, and the memory controller 106 are cut off, when the memory system 102 is in the Deep Sleep mode.

As compared with the Normal Sleep mode in which only the power supplies of the memory devices 104 are cut off, on this basis, the Deep Sleep mode may further cut off the power supply of the communication interface between the memory controller 106 and the host 108, and the power supply of the memory controller 106 itself, for example, cut off VCC, VCCQ and VCCQ2 voltages; and at this point, the memory system 102 reaches the minimum power. As can be seen, after the memory system 102 enters the Deep Sleep mode, a control portion and a storage portion of the memory system 102 are powered off and are in an off-line state. Therefore, before the memory system 102 enters the Deep Sleep mode, the memory controller 106 needs to store the currently running data of the memory system 102 into the memory arrays 301 of the memory devices 104 to avoid data loss caused by power failure. These data include, but not limited to, system data running in a register of the memory controller 106, data (e.g., a logical address-physical address mapping table) temporarily stored in the DRAM, and data that has not been transmitted in various communication interfaces such as the interface 516 or the data bus 518, etc.

The above descriptions are merely specific implementations of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory system, comprising:
   at least one memory device; and
   a memory controller coupled with the at least one memory device and configured to:
   in respond to an instruction of a host coupled with the memory system, control the memory system to enter a first activation mode and a transition mode sequentially, wherein:
   the transition mode includes an idle mode and a first sleep mode,
   a power of the memory system in the first sleep mode is less than a power of the memory system in the idle mode, and
   the power of the memory system in the idle mode is less than a power of the memory system in the first activation mode.

2. The memory system of claim 1, wherein the memory controller is further configured to:
   control the memory system to enter a second activation mode and a second sleep mode sequentially after being in the transition mode,
   wherein a power of the memory system in the second sleep mode is less than a power of the memory system in the second activation mode.

3. The memory system of claim 1, wherein:
   a ratio between a duration of the memory system in the idle mode and a duration of the memory system in the first sleep mode is determined based on historical data of the memory system switching from the idle mode to the first activation mode.

4. The memory system of claim 1, wherein:
   a duration of the memory system in the first sleep mode is longer than a duration of the memory system in the idle mode.

5. The memory system of claim 4, wherein:
   a ratio between the duration of the memory system in the idle mode and the duration of the memory system in the first sleep mode is 1:9.

6. The memory system of claim 2, wherein:
   the second sleep mode includes a Normal Sleep mode and a Deep Sleep mode;
   the first sleep mode includes the Normal Sleep mode;
   a power of the memory system in the Deep Sleep mode is less than a power of the memory system in the Normal Sleep mode; and
   in a process of controlling the memory system to enter the second sleep mode, the memory controller is further configured to:
   control the memory system to enter the Normal Sleep mode,
   maintain the memory system in the Normal Sleep mode for a period of time, and
   control the memory system to enter the Deep Sleep mode.

7. The memory system of claim 6, wherein the memory controller is further configured to:
   when the memory system enters the Normal Sleep mode, cut off a power supply of the at least one memory device.

8. The memory system of claim 6, wherein the memory controller is further configured to:
   store current data into the at least one memory device before the memory system entering the Deep Sleep mode.

9. The memory system of claim 6, wherein the memory controller is further configured to:
   when the memory system entering the Deep Sleep mode, cut off a power supply of the at least one memory device, a power supply of an interface between the memory controller and the host, and a power supply of the memory controller.

10. The memory system of claim 1, wherein the memory system comprises a Universal Flash Storage apparatus.

11. A method of operating a memory system, comprising:
    controlling, by a memory controller of the memory system in respond to an instruction of a host coupled with the memory system, the memory system to enter a first activation mode and a transition mode sequentially;
    wherein:
    the transition mode includes an idle mode and a first sleep mode,
    a power of the memory system in the first sleep mode is less than a power of the memory system in the idle mode, and
    the power of the memory system in the idle mode is less than a power of the memory system in the first activation mode.

12. The method of claim 11, further comprising:
    controlling, by the memory controller, the memory system to enter a second activation mode and a second sleep mode sequentially after being in the transition mode,
    wherein a power of the memory system in the second sleep mode is less than a power of the memory system in the second activation mode.

13. The method of claim 12, wherein:
    controlling the memory system in the first sleep mode includes controlling the memory system in a Normal Sleep mode;
    controlling the memory system in the second sleep mode includes:
    controlling the memory system to enter the Normal Sleep mode,
    maintaining the memory system in the Normal Sleep mode for a period of time, and
    controlling the memory system to enter a Deep Sleep mode; and
    a power of the memory system in the Deep Sleep mode is less than a power of the memory system in the Normal Sleep mode.

14. The method of claim 13, further comprising:
    cut off, by the memory controller when the memory system enters the Normal Sleep mode, a power supply of the at least one memory device.

15. The method of claim 13, further comprising:
    store, the memory controller before the memory system entering the Deep Sleep mode, current data into the at least one memory device.

16. The method of claim 13, further comprising:
    cut off, by the memory controller when the memory system entering the Deep Sleep mode, a power supply of the at least one memory device, a power supply of an interface between the memory controller and the host, and a power supply of the memory controller.

17. A non-transitory medium containing computer-executable instructions that, when executed by a hardware controller of a first electrical device, cause the hardware controller to perform a power management method for the first electrical device, the method comprising:

controlling, in respond to an instruction of a second electrical device coupled with the first electrical device, the first electrical device to enter a first activation mode and a transition mode sequentially;

wherein:

the transition mode includes an idle mode and a first sleep mode,         a power of the first electrical device in the first sleep mode is less than a power of the first electrical device in the idle mode, and         the power of the first electrical device in the idle mode is less than a power of the first electrical device in the first activation mode.

18. The non-transitory medium of claim 17, wherein the method further comprises:

controlling the first electrical device to enter a second activation mode and a second sleep mode sequentially after being in the transition mode,     wherein a power of the first electrical device in the second sleep mode is less than a power of the first electrical device in the second activation mode.

19. The non-transitory medium of claim 18, wherein:

controlling the first electrical device in the first sleep mode includes controlling the first electrical device in a Normal Sleep mode;

controlling the first electrical device in the second sleep mode includes:

controlling the first electrical device to enter the Normal Sleep mode,         maintaining the first electrical device in the Normal Sleep mode for a period of time, and         controlling the first electrical device to enter a Deep Sleep mode; and     a power of the first electrical device in the Deep Sleep mode is less than a power of the first electrical device in the Normal Sleep mode.

20. The non-transitory medium of claim 19, wherein the method further comprises:

when the first electrical device enters the first sleep mode or the second sleep mode, cutting off a power supply of a functional device in the first electrical device.

\* \* \* \* \*